United States Patent
Somashekhar

(10) Patent No.: US 7,167,480 B1
(45) Date of Patent: Jan. 23, 2007

(54) MULTI-SERVICE DATA TRANSPORT ARCHITECTURE

(75) Inventor: Hosagrahar Somashekhar, Plano, TX (US)

(73) Assignee: Lighthouse Capital Partners IV, LP, Greenbrae, CA (US)

( * ) Notice: Subject to any disclaimer, the term of this patent is extended or adjusted under 35 U.S.C. 154(b) by 896 days.

(21) Appl. No.: 09/886,518

(22) Filed: Jun. 21, 2001

(51) Int. Cl.
*H04L 12/56* (2006.01)

(52) U.S. Cl. ...................... 370/413; 370/419
(58) Field of Classification Search ............... 370/376, 370/380, 412, 413, 418
See application file for complete search history.

(56) References Cited

U.S. PATENT DOCUMENTS 5,126,999 A * 6/1992 Munter et al. ............. 370/415
6,434,115 B1 * 8/2002 Schwartz et al. ........... 370/235
6,781,984 B1 * 8/2004 Adam et al. ............... 370/360
6,807,186 B2 * 10/2004 Dally et al. ................ 370/413

\* cited by examiner

*Primary Examiner*—Ricky Q. Ngo
*Assistant Examiner*—Richard Chang
(74) *Attorney, Agent, or Firm*—Sprinkle IP Law Group

(57) ABSTRACT

An improved architecture for transmitting data from a plurality of sources to a plurality of destinations, wherein pieces of data directed to each destination are aggregated and transmitted periodically. In one embodiment, a plurality of ingress edge units and a plurality of egress edge units which are each coupled to an optical switching matrix. The ingress edge units are configured to parse incoming signals into components, each of which is destined for a particular one of the egress edge units. A switch is configured to store the data components destined for each egress edge unit in a corresponding buffer or set of buffers. Each of the buffers is read sequentially during a corresponding timeslot, with the data stored therein being transmitted to the designated egress edge unit. The data is thereby time-multiplexed for transmission to the egress edge units.

7 Claims, 6 Drawing Sheets

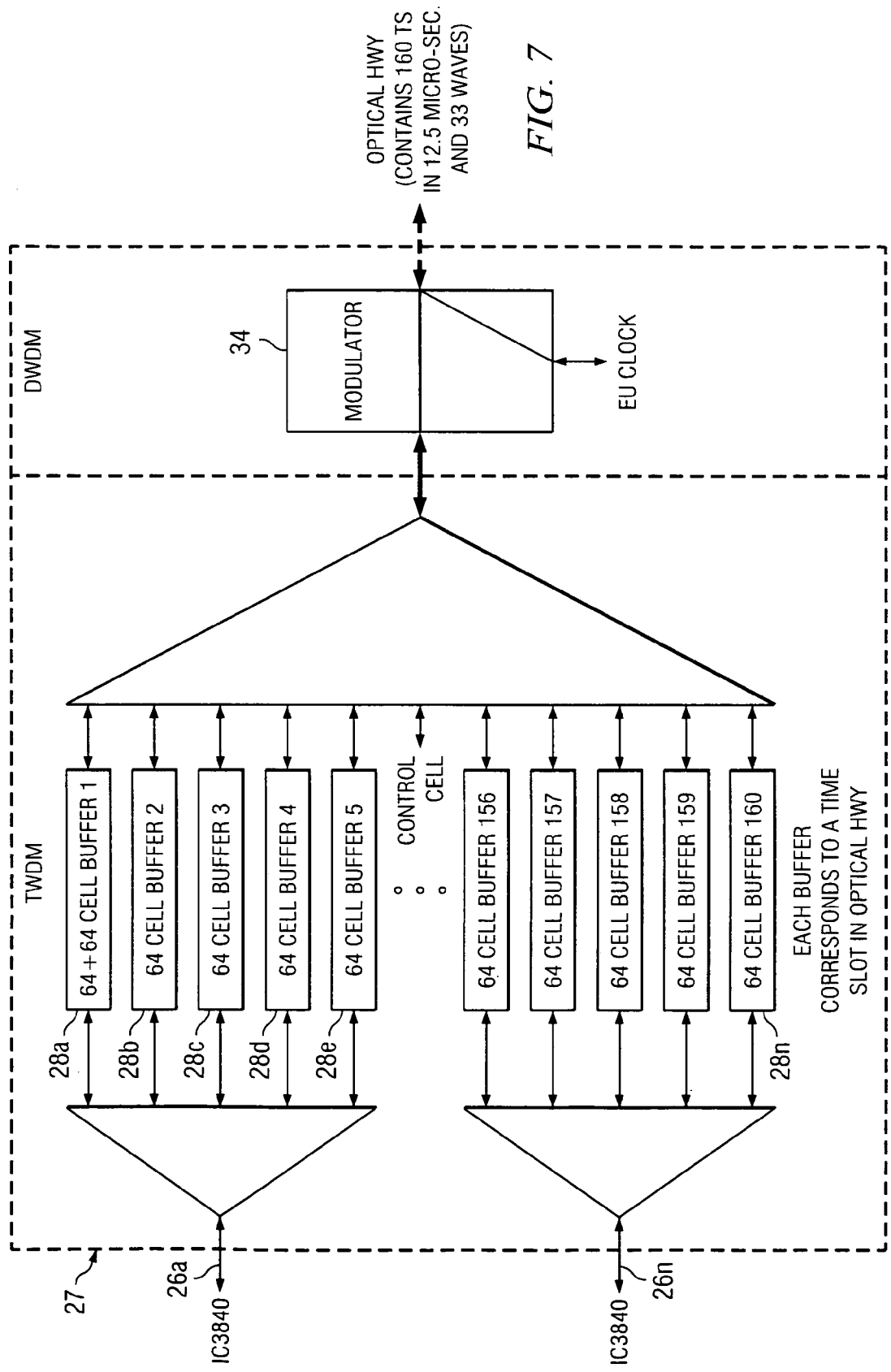

MULTI-SERVICE DATA TRANSPORT ARCHITECTURE

FIELD OF THE INVENTION

The invention relates generally to systems and methods for the transmission of data and more particularly to a data transport architecture which is designed to improve performance in data transmission by aggregating data destined for particular destinations and transmitting the aggregated data at regular intervals.

BACKGROUND OF THE INVENTION

With the increasing computing power that is available for both commercial and private use, there is an increased demand for data transfer on a number of levels. Particularly, the emergence of the Internet and the ability of businesses and individuals to easily communicate with others around the world has created a need for greater speed, quality and capacity than ever before.

Users who are connected to the Internet and other networks may have access to many other users and/or devices which are also connected to the network. At different times, any given part of the network may be in use by a particular pair of devices which are transmitting data between them. While this part of the network is occupied with the transmission of this data, it cannot be used for the communication of data between another pair of users or devices. Consequently, data transfers between some users/devices may be blocked while a data transfer between another pair of users/devices is being performed. This generally leads to increased latency in data transfers and may result in more severe disruption of communications between the corresponding devices.

This problem may be alleviated in part by the use of hardware which provides increased capacity for data traffic. Because each individual data transaction can, on average, be completed more quickly in such a higher-capacity system, the corresponding data stays in the system for a shorter period of time and presents a reduced potential for blocking other transactions. It is, however, usually expensive to replace available systems with hardware which has a greater capacity, so it may be impractical to simply provide greater capacity, particularly in a widely distributed system. Further, once the improved system reaches the limits of its capacity, more hardware or a new technological advance is required to provide even greater data transfer capacity.

One response to the demand for increased performance in data transfers has been the development of optical data transfer systems. These systems use light instead of electrical signals to carry data from one point to another. Optical data transfer systems typically have much greater bandwidth than electrical systems of comparable size and cost, and are capable of providing higher quality signals for data transmission.

While optical data transfer systems may provide advantages over electrical systems, they may also suffer from some of the same problems. For example, the latency of data transfers may be increased as a result of blocking. Further, optical systems may have to be used in conjunction with older, more capacity-limited hardware (including optical hardware) which may not be able to fully utilize the capabilities of the new optical hardware. It would therefore be desirable to provide systems and methods which have high data transfer capacities and which are useful in conjunction with different types of existing hardware.

SUMMARY OF THE INVENTION

One or more of the problems outlined above may be solved by the various embodiments of the invention. Broadly speaking, the invention comprises an improved architecture for transmitting data from a plurality of sources to a plurality of destinations, wherein pieces of data directed to each destination are aggregated and transmitted periodically.

One embodiment of the present invention is a multi-service cross connect, switching and routing system which is scalable from sub-terabits to multi-petabits of data traffic. This system can be configured to support OCn and Wave interfaces at all industry standards, including but not limited to OC48, OC192 and OC768. The system may be configured to work with incoming signal frame structures including but not limited to SONET, DIGITAL WRAPPER, CUSTOM WRAPPER and ETHERNET. The incoming signal may also contain, for example, IP, MPLS, ATM, Frame Relay, Ethernet or TDM payload data. Some of the features of the system may include the ability to provide services and a truly distributed server pool, the ability to connect incoming traffic to appropriate server modules, and the ability to interconnect several islands of interfaces and the server pools via an optical time- and space-multiplexed core.

One embodiment of the invention comprises a system for interconnecting a plurality of ingress edge units and a plurality of egress edge units which are each coupled to an optical switching matrix (or fabric.) The ingress edge units in this embodiment are configured to parse incoming signals into components, each of which is destined for a particular one of the egress edge units. The ingress edge units are configured to store the data destined for each egress edge unit in a corresponding buffer or set of buffers. Periodically, each of the buffers will be read in sequence, with the corresponding data being transmitted to the designated egress edge unit. Each buffer is associated with a corresponding time slot in a repeating signal. The data in each of the buffers is transferred to the corresponding egress unit in the corresponding time slot. The data received by the ingress edge units and stored in the respective buffers is thereby time-multiplexed, substantially reducing the latency of data transfers within the system.

One embodiment of the invention comprises an ingress edge unit which is configured to receive a plurality of optical signals and to multiplex them into a single optical signal which has a higher data rate and which is suitable for transmission over an optical switching matrix. The ingress edge unit comprises a plurality of network interface cards which are configured to receive a plurality of incoming optical signals. The network interface cards accept signals in a format such as SONET OC192 and package the frames of the signals in cells, each of which contains a portion of a SONET frame. The cells are passed to a crossbar switch which routes them to either an IP server module (if the corresponding data signal contains packet data,) or one of a plurality of buffer units (if the corresponding data signal comprises simple data traffic.) If the data signal comprises packet data, the IP server modules are configured to process the data and repackage it into cells. These cells are transmitted back to the switch, which routes them to the appropriate buffer units. Each of the buffer units in a preferred embodiment comprises five buffers, each of which is sequentially filled with data having the same destination. Each buffer corresponds to a particular time slot during which data is read out of the buffer and transmitted out of the ingress edge unit (via an optical interconnect to an optical matrix, and then via another optical interconnect to the appropriate egress edge unit.) The ingress edge unit thereby effectively performs time-division multiplexing of the various data signals input to the unit.

One embodiment of the invention comprises a method for transmitting multi-service data (e.g., wave service data and SONET service data) from a plurality of ingress lines to a plurality of egress lines. The data signals received by the system are parsed into components, each of which can be separately addressable to a corresponding destination. The destination corresponding to each of the cells is identified, and the cells are forwarded to corresponding buffers, wherein each buffer contains only cells which are to be forwarded to the same destination. The buffers are read sequentially (e.g., every 12.5 microseconds in the preferred embodiment.) Each buffer is read during a corresponding time slot, and all of the data read out of the buffer is forwarded to the corresponding destination. Thus, data which is directed to a first destination is transmitted, then data directed to a second destination is transmitted, and so on. There is no constraint on the destinations (i.e., the destinations associated with data in consecutive time slots may be consecutive or non-consecutive, and some may be associated with several time slots, while other destinations are not associated with any of the time slots.)

Numerous alternative embodiments are also possible.

BRIEF DESCRIPTION OF THE DRAWINGS

Other objects and advantages of the invention may become apparent upon reading the following detailed description and upon reference to the accompanying drawings in which:

FIG. 7 is a diagram illustrating the multiplexer corresponding to the embodiment of FIG. 2;

Figure 1:
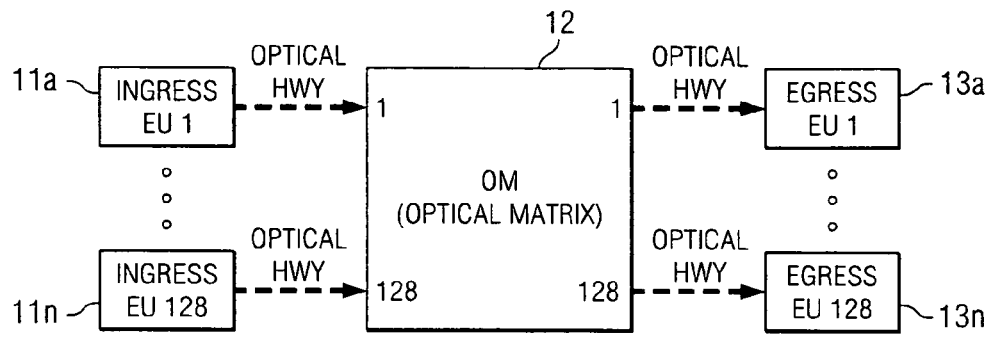
FIG. 1 is a diagram illustrating a data transfer system incorporating an architecture in accordance with one embodiment of the present intention.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises an improved architecture for transmitting data from a plurality of sources to a plurality of destinations, wherein pieces of data directed to each destination are aggregated and transmitted periodically. This may reduce contention for resources (e.g., a switching matrix through which the data is transmitted) that are required to perform the data transfers between the respective sources and destinations and consequently reduce the latency of the transfers.

Referring to FIG. 1, a diagram illustrating a data transfer system incorporating an architecture in accordance with one embodiment of the present intention is shown. As depicted in this figure, the system comprises a plurality of ingress edge units 11, a plurality of egress edge units 13 and an optical switching matrix 12. Each of ingress edge units 11 is configured to receive a data and forward the data to optical switching matrix 12. Optical switching matrix 12 forwards the data to one or more of egress edge units 13 to which the data is directed.

It should be noted that, for the purposes of this disclosure, identical items in the figures may be indicated by identical reference numerals followed by a lowercase letter, e.g., 12*a*, 12*b*, and so on. The items may be collectively referred to herein simply by the reference numeral.

In the embodiment of FIG. 1, the system is configured with 128 ingress edge units 11 and 128 egress edge units 13. It should be noted that the ingress edge units are indicated by reference numerals 11*a* and 11*n*. This is not intended to indicate that there are only 14 ingress edge units (a, b, c, . . . n,) but it is instead intended to indicate that there may be any number (n) of these units in a given embodiment. Likewise, the egress edge units are indicated by the reference numerals 13*a* and 13*n*, even though there are 128 egress edge units in this embodiment.

With respect to each piece of data which is to be transferred through the system, the system appears essentially as a pair of ingress and egress edge units. That is, each piece of data will be received by one of the ingress edge units 11 and transmitted through optical switching matrix 12 to one of the egress edge units 13. The data may be received at each ingress edge unit via one or more ingress ports, and may be distributed to one or more egress ports of the egress edge unit after it is received by the egress edge unit.

Figure 2:
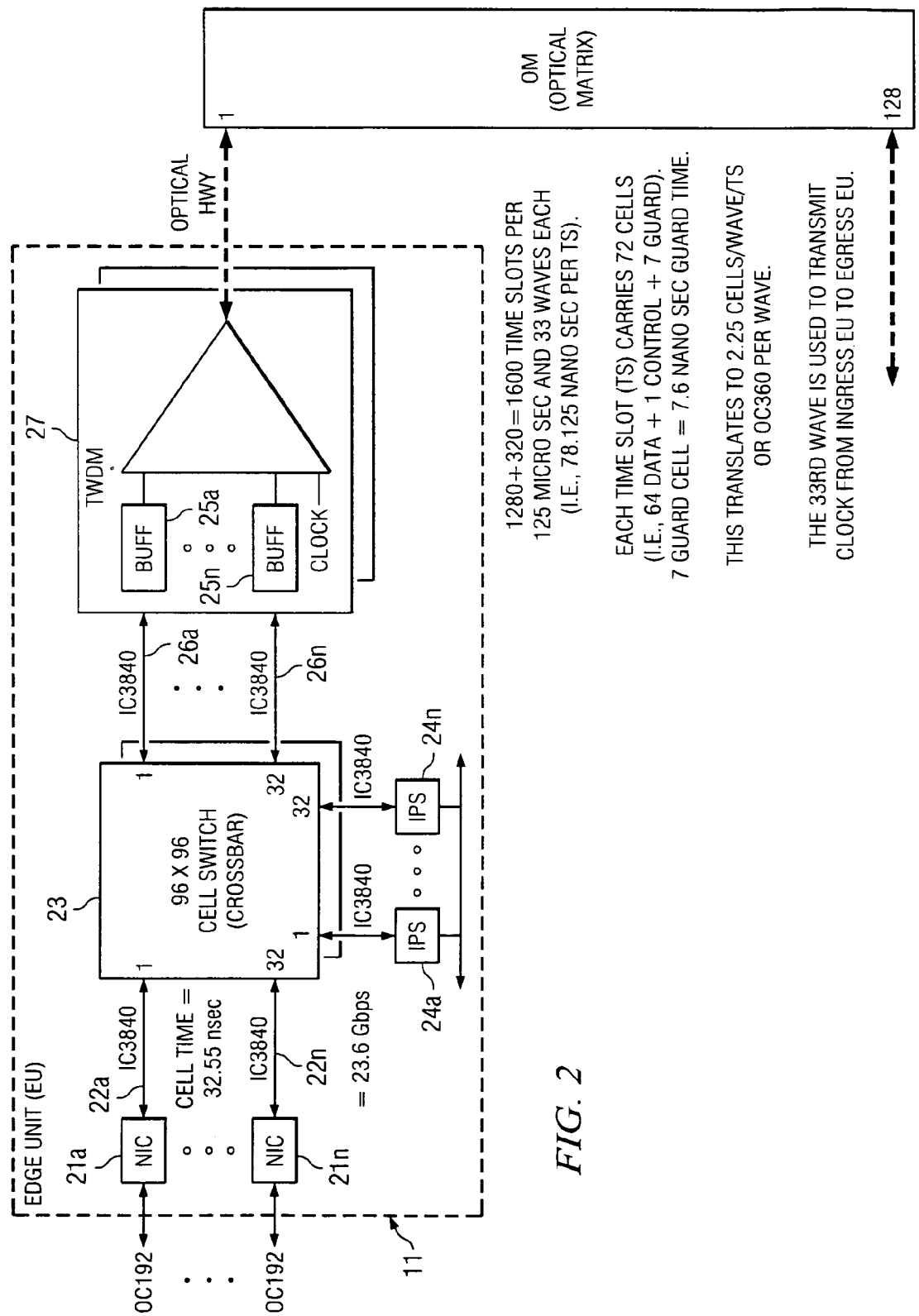
FIG. 2 is a diagram illustrating an ingress edge unit in one embodiment of the invention.

Referring to FIG. 2, a diagram illustrating in more detail ingress edge unit 11 in one embodiment of the invention is shown. As depicted in this figure, ingress edge unit 11 comprises a plurality of network interface cards 21 which are coupled to the inputs of ingress edge unit 11 to receive incoming data. Network interface cards 21 are configured to transfer the data over interconnect 22 to crossbar switch 23. Crossbar switch 23 is configured to convey the data received from network interface cards 21 to selected ones of buffer units 25. IP service modules 24 are also coupled to crossbar switch 23.

It should be noted that the network interface cards are indicated by reference numerals 21*a* and 21*n* to indicate that there may be n of these devices in a given embodiment. In the embodiment depicted in FIG. 2, there are 32 network interface cards 21 coupled to switch 23. The same is true of IP service modules 24 and buffer units 25.

Each of the network interface cards 21 in this embodiment is configured to receive OC192 SONET data. Each of the network interface cards 21 handles an optical signal having a different wavelength. Thus, the system depicted in FIG. 2 is configured to handle 32 different channels (wavelengths.) The data is transmitted from network interface card 21 to switch 23 via interconnect 22. Interconnect 22 is configured to carry 3840 cells per 125 milliseconds (approximately 18.88 Gbps, or the equivalent of 384 STS1 frames.) Interconnect 22 thereby provides 100 percent expansion (twice the capacity of the incoming of OC192 signal,) enabling switch 23 to operate in a non-blocking manner, as well as allowing multicasting, control messages and similar features to be provided.

Network interface cards 21 are configured to serve as a termination for the SONET section and line corresponding to the incoming data line. Network interface card 21 is configured to package 81 bytes from each STS1 or STSnc frame into a cell. Each cell contains 96 bytes, including 84 data bytes and 12 header bytes. Each frame may therefore be transported in 10 cells. This translates to a sampling rate of 12.5 microseconds. Network interface card 21 is further configured to append the appropriate destination address (e.g., destination IP server or destination STS1/STSnc) to the cells.

Crossbar switch 23 is a non-blocking switch that is configured to route cells received from network interface cards 21 to either IP server modules 24 or buffer units 25. Switch 23 is configured to provide grooming and routing functions for STS1 and STSnc frames that are destined for the same time slot (as will be explained in more detail below.) If crossbar switch 23 directs a piece of data to one of buffer units 25, it selects the appropriate buffer unit according to a selection algorithm. The details of this algorithm are beyond the scope of the present disclosure. It is sufficient for the purposes of this disclosure to note that any suitable algorithm may be selected for implementation in a given embodiment. The selection of the algorithm may be based upon various factors, such as the type and amount of traffic which is expected to be handled by the switch. It should be noted that one embodiment associates the data in each buffer unit with a corresponding egress edge unit, rather than a corresponding egress port exiting the egress edge unit. This allows consolidation of all the data for all of the egress ports in an egress edge unit and thereby reduces the probability of blocking.

Buffer units 25 are configured to receive data from interconnects 26. The data which is forwarded to each of buffer units 25 is determined by switch 23. In the embodiment depicted in FIG. 2, buffer units 25 comprise 160 buffers, each of which is 64 cells deep. Each of the 32 channels which are routed by switch 23 has a corresponding set of five buffers which store the data prior to delivery to the switching matrix. The buffers are read sequentially every 12.5 microseconds. The data is converted into 32-bit parallel form, and each bit is modulated into individual waves and inserted into the corresponding time slot for transmission to the switching matrix. The buffers serve as the basis for time- and wavelength-division multiplexing which is performed by multiplexer 27. It should be noted that, in addition to the 32 channels which are multiplexed by multiplexer 27, a local clock signal is also multiplexed into the data stream to provide a basis for demultiplexing/decoding the data.

The STS1 and STSnc frames which are received by network interface cards 21 may comprise simple data (i.e., a stream of data bits) or packet data. If they contain packet data, the STS1/STSnc frames are routed to one of the IP server modules 24, where they are terminated. The IP traffic is processed and repackaged into cells which are transmitted back to crossbar switch 23. Crossbar switch 23 then routes each IP cell to the appropriate one of buffer units 25, from which the data can be transmitted to the corresponding destination edge unit(s). If the STS1 and STSnc frames which are received by network interface cards 21 contain simple data, the frames are not terminated, but are packaged into internal cells which are routed through switch 23 to buffer units 25.

Figure 3:
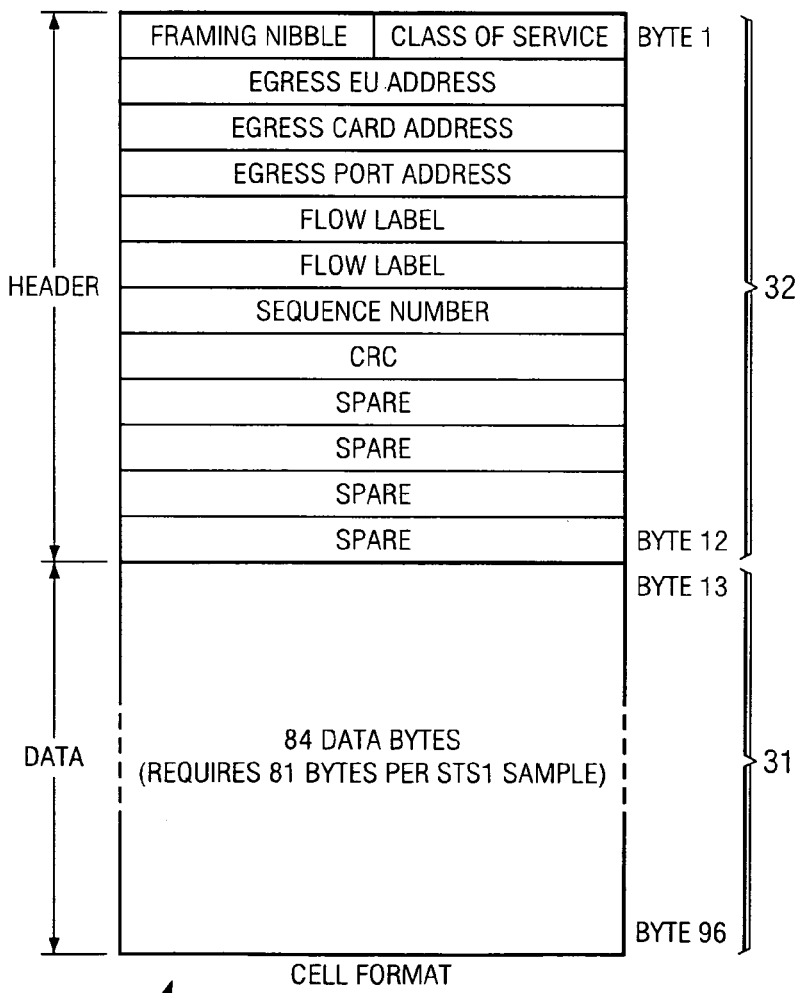
FIG. 3 is a diagram illustrating the structure of a data cell as utilized in one embodiment of the invention.

Referring to FIG. 3, a diagram illustrating the structure of a data cell as utilized in one embodiment of the invention is shown. As indicated by the figure, cell 30 comprises payload data 31 and header data 32. In this embodiment, header 32 consists of information such as the address of the egress edge unit, the address of the egress card, the address of the egress port, two flow labels, a sequence number, a cyclic redundancy check number and four spare bytes. The payload portion of the cell comprises 84 bytes, 81 of which are used to transport the data.

Figure 4:
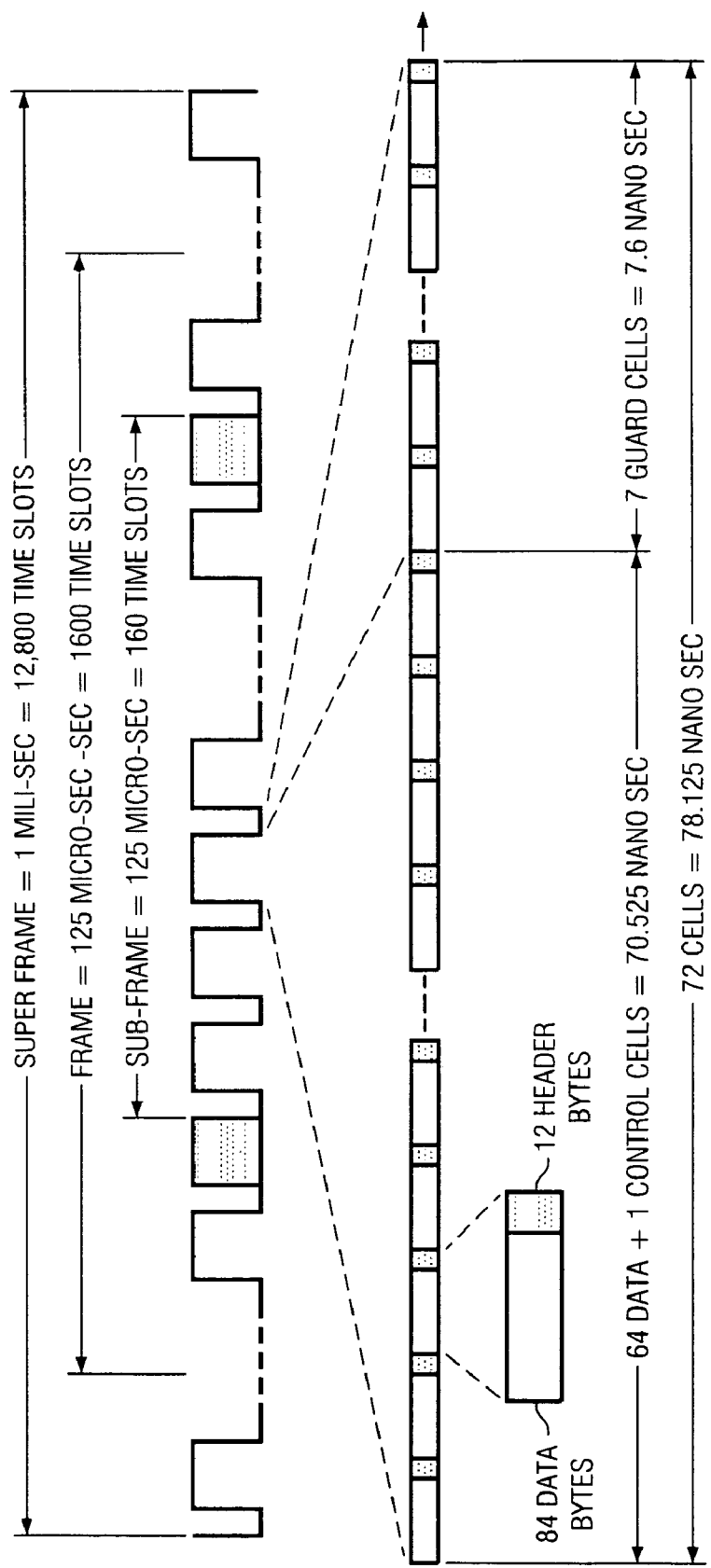
FIG. 4 is a diagram illustrating the timing which is used to transmit data from an ingress edge unit to a switching matrix in one embodiment.

Referring to FIG. 4, a diagram illustrating the timing which is used in one embodiment to transmit data from an ingress edge unit to the switching matrix in one embodiment is shown. The timing which is depicted in the figure is based upon the timing of the STS1/STSnc frames. It can be seen in the figure that one such frame has a temporal length of 125 microseconds. This can be broken down into 10 subframes, each of which is 12.5 microseconds long. The timing which is shown in FIG. 4 corresponds to the system illustrated in the previous figures, which employs 160 buffer units 25 to hold data routed by switch 23. Consequently, each of the subframes is broken down further into 160 time slots. (Remember that five buffers are used for each of the 32 channels.)

Each time slot is 70.525 nanoseconds long, and can hold 65 cells (assuming that each cell contains 96 bytes, as described above.) The system is configured so that 64 of these cells contain data, while one of the cells contains control information. It can be seen from the figure that each of the time slots is separated from the adjacent time slots by an interval during which no data is anticipated to be transmitted. This interval is equivalent to 7 cells (7.6 nanoseconds.) These intervals may be considered guard cells. Essentially, the purpose of the guard cells is to maintain the separation between adjacent time slots.

Figure 5:
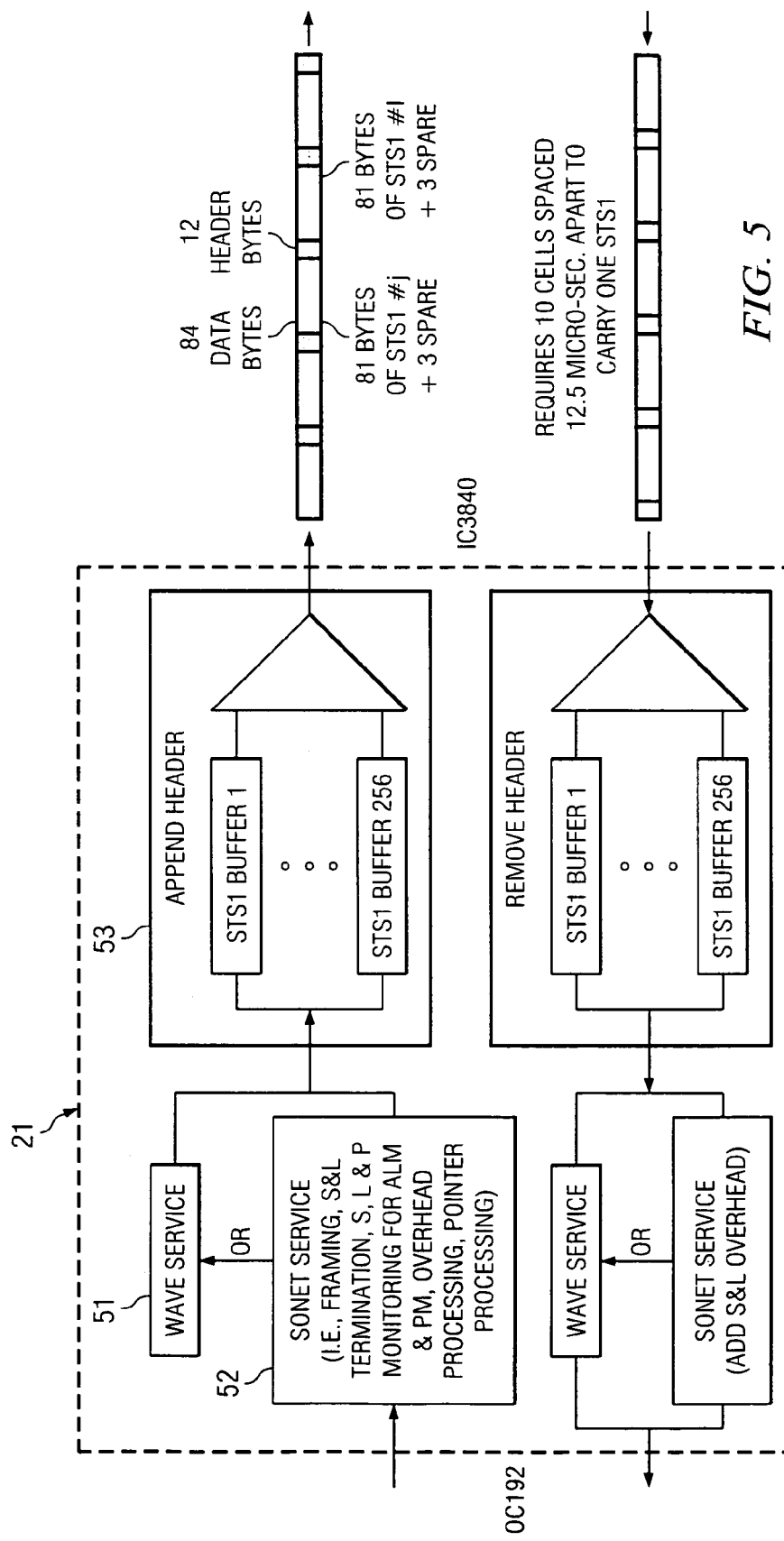
FIG. 5 is a diagram illustrating the structure of the network interface cards in one embodiment.

Referring to FIG. 5, a diagram illustrating the structure of network interface cards 21 in one embodiment is shown. In this embodiment, network interface card 21 is configured to both transmit and receive data. Thus, network interface card 21 can function in either an ingress edge unit mode or an egress edge unit mode.

In terms of an ingress edge unit, network interface card 21 includes wave service and SONET service components 51 and 52. Incoming data is processed either by wave service component 51 or SONET component 52, depending upon the type of service which is desired. ("Wave service" is used here to refer to the transmission of data in a such a manner that the data signal which is produced at the destination is substantially identical to the data signal which is input to the system. "SONET service" is a data transmission format in which the framing data which is originally contained in the data signal may be replaced with updated framing data as a normal part of the system's processing in the transport of the data.)

If the system is configured to provide SONET service, the received (e.g., OC192) data signal is manipulated in a fashion which is well-known and well understood in the art (and consequently will not be described in detail here.) The data is then conveyed to buffer unit 53, where it is temporarily stored until it can be read out of the buffer and transported to the crossbar switch for routing. If the system is configured to provide wave service (i.e., to provide a substantially identical signal to the original signal at the destination,) the receive data signal is processed in such a way that the bit sequence and timing information associated with the signal are retained (so that the substantially identical signal can be re-generated at the signal's destination.) In this situation, the data signal is parsed and stored in buffer unit 53 in the same manner as in the wave service mode.

As indicated in FIG. 5, in order to transport a single STS1 signal, it is necessary to transmit 10 cells (one STS1 frame) every 12.5 microseconds (the period of one STS1 frame.) As shown in FIG. 4, this is a small fraction of the capacity of the data signal which will be conveyed via multiplexer 27 to the switching matrix (160 time slots, or 11,520 cells per 12.5 microseconds.)

Figure 6:
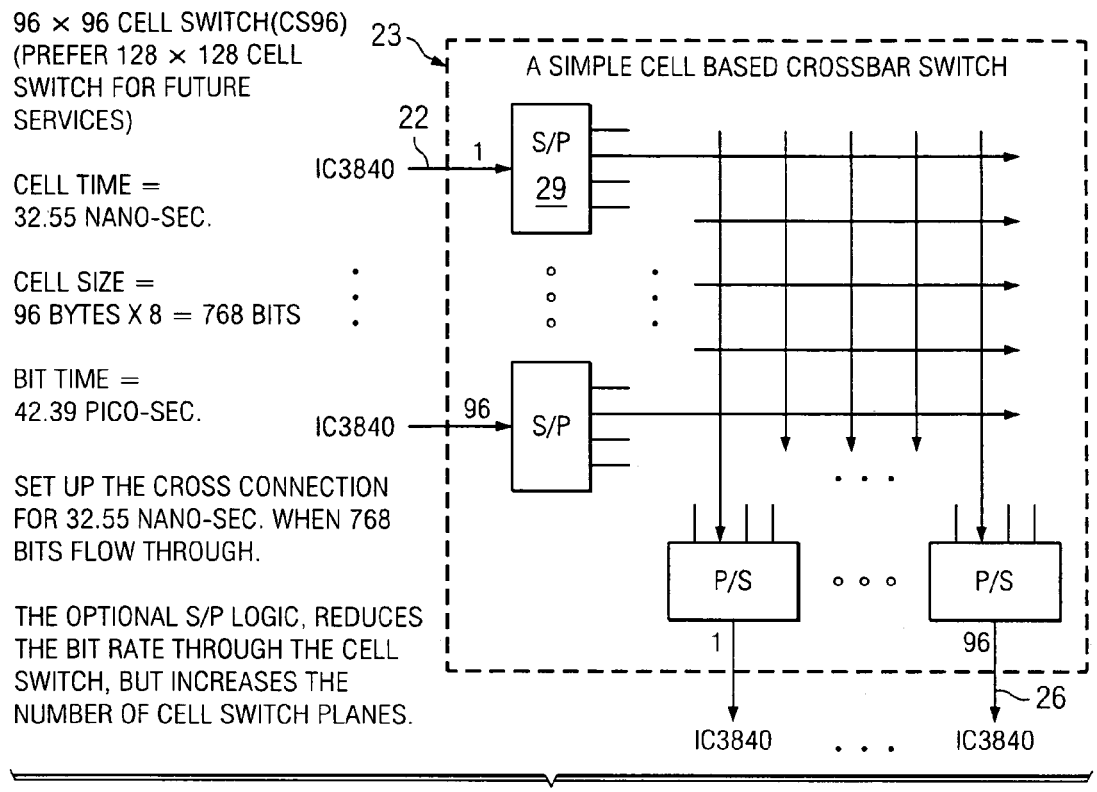
FIG. 6 is a diagram illustrating a crossbar switch in one embodiment of the present invention.

Referring to FIG. 6, a diagram illustrating a crossbar switch in one embodiment is shown. In this figure, the inputs 22 from the network interface cards are shown on the left side of the figure, while the outputs 26 to the buffers and multiplexer are shown on the bottom of the figure. In this figure, switch 23 is depicted with S/P logic 29 which increases the number of switch planes and thereby increases the number of data lines which can be handled by the switch.

In one embodiment, the switch is configured to route cells which have a size of 768 bits (96 bytes×8 bits/byte=768 bits) and a corresponding period of 32.55 nanoseconds. Switch 23 is therefore configured to establish a cross connection for 32.55 nanoseconds to allow the 768 bits of an individual cell to flow through the switch. It should be noted that the S/P logic, which is optional, may reduce the bit rate of the data which can be routed by the switch, but it will also increase the number of switch planes.

Referring to FIG. 7, a diagram illustrating in more detail the multiplexer corresponding to the embodiment of FIG. 2 is shown. Data from the switch is transmitted to the multiplexer via one of 32 interconnects 26. Each interconnect 26 is coupled to a set of five buffers 28, giving a total of 160 buffers. Each buffer corresponds to one of 160 time slots on the optical highway. In this embodiment, each buffer is configured to store 64 cells. Data which is received via interconnects 26 is stored in one of the 160 buffers corresponding to a time slot destined for an egress unit. In this manner, the 160 buffers provide storage for up to 10,240 cells which are received from the interconnect every 12.5 milliseconds.

In the embodiment of FIG. 2, there are 32 interconnects 26 and corresponding buffer units 25. Since there are five individual buffers 28 per buffer unit 25, there are a total of 160 individual buffers 28. The data contained in these buffers is read out of each buffer sequentially. In other words, the data is readout of buffer 28*a*, then buffer 28*b*, and so on. After the last buffer (28*n* in FIG. 7,) the first buffer (28*a*) is read again and the sequence continues.

As indicated in FIG. 4, there are 160 time slots in each 12.5 microsecond subframe. Data is read out of one of buffers 28 during each time slot. Consequently, data is sequentially read out of all of the buffers every 12.5 microseconds. More specifically, each buffer has a corresponding, dedicated time slot in each subframe during which data will be read out of the buffer.

As indicated in FIG. 4, the data stream which is transmitted through the switching matrix includes not only the 64 data cells which are read out of the buffer, but also one control cell. Further, seven guard cells are transmitted between each data/control cell set. Thus, a total of 72 cells are transmitted during each time slot.

The reading of the data out a buffers 28 is controlled by multiplexer/modulator unit 34. As indicated above, multiplexer/modulator unit 34 reads the data out of one of buffers 28, adds a control cell and seven guard cells, and then repeats this process with each successive buffer, producing a single, multiplexed data stream. In this embodiment, the data stream is modulated and transmitted to an optical switching matrix. Because all of the cells in a given time slot are destined for the same egress edge unit, all of these cells are delivered by the optical switching matrix to that egress edge unit. The cells in subsequent time slots may be delivered to that same egress edge unit, or to any other egress edge unit (keeping in mind that all of the cells in a particular time slot will be delivered to the same egress edge unit.)

It should be noted that, in this embodiment, multiplexer/modulator unit 34 is configured to multiplex a local clock signal into the transmitted data stream. This signal is used by the egress edge unit to decode the data. The clock signal may also be used to regenerate the timing associated with a data signal which is reconstructed by the egress edge unit.

For a given subframe, each interconnect 26 and corresponding buffer corresponds to one of 160 time slots which, in turn, corresponds to one of 128 egress edge units. This egress edge unit is the destination for all of the cells which are transmitted to and stored in the corresponding buffers 28. Each of the 160 buffers contains only data which is destined for the corresponding egress edge unit. The egress edge unit corresponding to a particular interconnect 26 need not be unique. Several buffers may contain data destined for the same egress edge unit. Consequently, some of the egress edge units may be destined to receive data from several buffers, while other egress edge units may not be a destination for any of the data in any of the buffers. (It should be noted that the buffer units are assigned on an as-needed basis, so the association of a particular buffer unit with a corresponding egress edge unit may change over time.)

Figure 8:
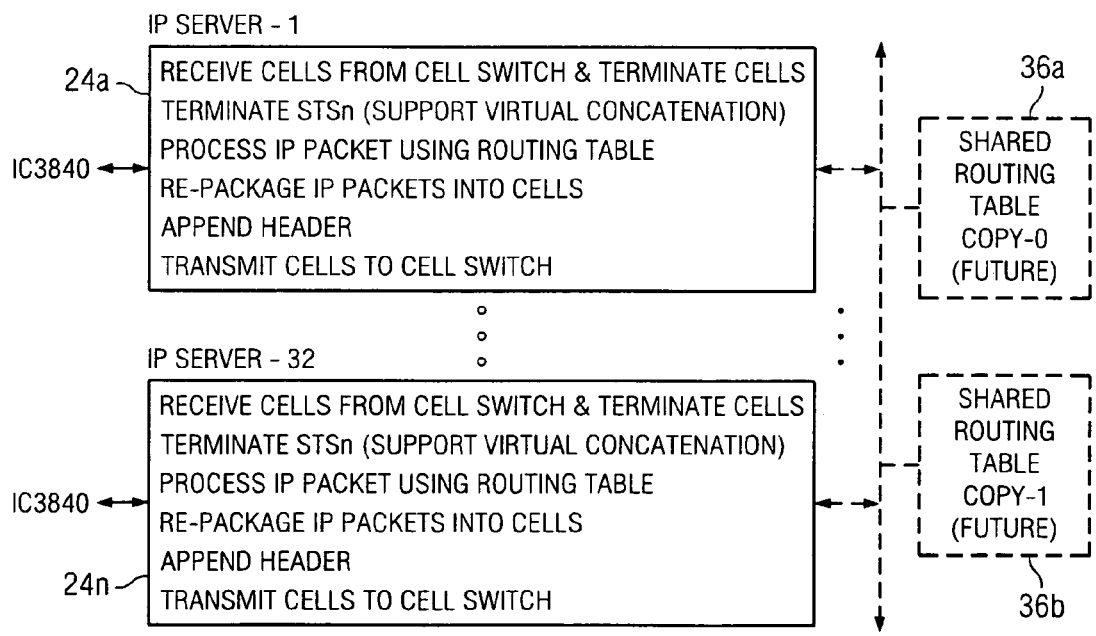
FIG. 8 is a diagram illustrating IP service modules in one embodiment of the present invention.

Referring to FIG. 8, a diagram illustrating the IP service modules in one embodiment is shown. IP service modules 24 are coupled to the crossbar switch 23 to communicate data to and from the switch. IP service modules 24 may also be coupled to one or more shared routing tables 36. The IP service modules are configured to perform service functions, including receiving cells from the crossbar switch and terminating the cells, terminating STSn (supporting virtual concatenation,) processing IP packets using the routing tables, repackaging IP packets into cells, appending headers and transmitting cells back to the crossbar switch.

Figure 9:
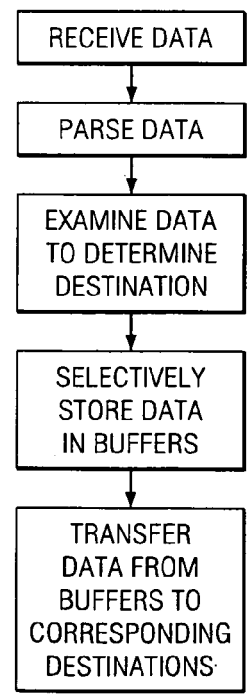
FIG. 9 is a flow diagram illustrating a method which is implemented in one embodiment of the present invention.

Referring to FIG. 9, a flow diagram illustrating a method which is implemented in one embodiment of the present invention is shown. In this embodiment, a plurality of data streams are received. Each data stream comprises a series of smaller pieces of data. The pieces of data are parsed and examined to determine their respective destinations. The pieces of data are then selectively stored in a plurality of buffer units. The pieces of data are stored so that all of the pieces of data in a particular buffer unit have the same destination. As more data is received, more is accumulated in the buffer units. The data in each buffer is transmitted in a sequential, round-robin fashion. In other words, the data is transferred from a first buffer unit to the corresponding destination, then the data from a second buffer unit is transferred to its destination, and so on. After the data has been transferred from all of the buffer units to their respective destinations, the process resumes with the first buffer unit. Thus, each of the buffers is periodically read and the data therein transmitted to the destination corresponding to the buffer unit. (It should be noted that the data is constantly being received, parsed and stored in the buffers so that, while data is being read out of one buffer, other data is being stored in the remaining buffers.)

In this embodiment, the buffer units are allocated on the basis of the data which needs to be stored. As pieces of data are received, the corresponding destinations are determined. If a buffer unit has already been allocated to one of the destinations and the buffer unit is not full, then pieces of data which are directed to that destination are stored in the buffer unit. If a buffer unit has not been allocated for the destination of the received pieces of data, or if the allocated buffer unit is full, another buffer unit can be allocated for storage of pieces of data directed to that particular destination. Each buffer unit is associated with one particular timeslot in a subframe, as described in more detail above. The pieces of data stored in each buffer unit are transmitted to the corresponding destination during the assigned timeslot. During the remainder of the subframe, the buffer unit accumulates data to be transmitted during the next occurrence of the assigned timeslot.

In addition to the foregoing method, the present disclosure teaches methods which are consistent with the particular system embodiments which are described in detail above. For example, in relation to the system depicted in FIG. 2 (and the accompanying descriptive text,) a method of one embodiment comprises receiving a plurality of optical signals at an ingress unit, processing these signals within network interface cards to generate data cells, routing each cell through a switch to route it (possibly through an IP service module) to a buffer where it will be stored with other cells directed to the same destination, and periodically transmitting the cells in a buffer to the corresponding destination in a time slot which is associated with the buffer. Such methods are apparent from the descriptions of the system embodiments and are therefore considered to be within the scope of this disclosure.

The systems and methods described above may provide a number of advantages over conventional systems and methods. For example, the present systems and methods are scalable (i.e., they can be increased or decreased in size to provide more or less data transfer capacity, as needed for a particular implementation.) Generally speaking, the systems and methods can be scaled upward by increasing the capacity of each edge unit, increasing the speed of the interconnect between the ingress edge units and the switching matrix, increasing the number of wavelengths which are used and increasing the number of switching matrix planes. The present systems and methods can be scaled downward by, for example, reducing the number of edge units and/or wavelengths used in the system.

In addition to scalability, the present systems and methods may provide some of the following advantages: they may significantly reduce the probability of blocking; they may reduce the convergence time required by a scheduler; they may reduce the latency of data transfers; they may provide equal accessibility to all of the egress edge units; they may support STS1 level granularity; they may support virtual concatenation; they may support true multi-service (over SONET, Digital Wrapper, Custom Wrapper, Lambda); they may reduce the need for multiple network interface card types; and they may provide reduced cost.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for transporting data from a plurality of ingress lines to a plurality of egress lines comprising:
    a data switching matrix having a plurality of ingress ports and a plurality of egress ports, wherein for each of the ingress ports, the data switching matrix is configured to transport data from each the ingress port to one of the plurality of egress ports;
    a plurality of ingress edge units, each of which is coupled to one of the plurality of ingress ports of the data switching matrix, wherein each of the plurality of ingress edge units is configured to receive a data from a corresponding one or more of a plurality of ingress lines;
    a plurality of egress edge units, each of which is coupled to one of the plurality of egress ports of the data switching matrix, wherein each of the plurality of egress edge units is configured to transmit data received from the data switching matrix to one or more of a plurality of egress lines;
    wherein each of the plurality of ingress edge units is configured to examine data received via the corresponding ingress lines and to identify portions of the data corresponding to each of the egress edge units,
    wherein portions of the data corresponding to each of the egress edge units is stored in a corresponding buffer, and wherein data in each buffer is transmitted to the corresponding egress edge unit via the data switching matrix in a predetermined time slot,
    wherein the ingress edge unit comprises:
        one or more ingress ports, each of which is configured to be coupled to an ingress data line;
        a switch coupled to the one or more ingress ports; and
        a plurality of buffers coupled to the switch;
        wherein the switch is configured to store data received via the one or more ingress ports in the plurality of buffers,
        wherein the data stored in each of the plurality of buffers is destined for a corresponding one of a plurality of destinations; and
    wherein the ingress edge unit is configured to:
        transmit data from each of the plurality of buffers in a corresponding predetermined time slot, and
        schedule data from each of the plurality of buffers to be delivered to the corresponding one of the plurality of destinations, independent of the predetermined time slot.

2. The system of claim 1 wherein the ingress edge unit further comprises a multiplexer coupled to the plurality of buffers and configured to multiplex data contained in the plurality of buffers into a single data stream.

3. The system of claim 2 wherein the multiplexer is configured to multiplex clock data into the single data stream.

4. The system of claim 3 wherein the clock data is embodied in an optical signal comprising a wavelength which is distinct from a plurality of wavelengths used for optical data signals.

5. The system of claim 1 wherein the ingress edge unit further comprises a plurality of network interface cards coupled to the ingress lines, wherein each network interface card is configured to receive a data signal from the corresponding ingress line in a corresponding format.

6. The system of claim 1, wherein the corresponding one of a plurality of destinations for each of the plurality of buffers is assigned on an as-needed basis.

7. The system of claim 1, wherein the corresponding one of a plurality of destinations for each of the plurality of buffers is a corresponding egress edge unit.

* * * * *